US011496397B2

(12) United States Patent
Li et al.

(10) Patent No.: US 11,496,397 B2
(45) Date of Patent: Nov. 8, 2022

(54) TRANSPARENT QUANTITATIVE CONGESTION CONTROL

(71) Applicant: Verizon Patent and Licensing Inc., Basking Ridge, NJ (US)

(72) Inventors: Feng Li, Lexington, MA (US); Haim S. Ner, Fair Lawn, NJ (US); Bjorn Olof Erland Kalderen, South Orange, NJ (US); Kevin J. Marnik, Bethel Park, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 26 days.

(21) Appl. No.: 17/142,384

(22) Filed: Jan. 6, 2021

(65) Prior Publication Data

US 2022/0217088 A1 Jul. 7, 2022

(51) Int. Cl.
*H04L 47/12* (2022.01)
*H04L 47/10* (2022.01)

(52) U.S. Cl.
CPC .............. *H04L 47/12* (2013.01); *H04L 47/29* (2013.01)

(58) Field of Classification Search
CPC ............................... H04L 47/12; H04L 47/29
See application file for complete search history.

(56) References Cited

U.S. PATENT DOCUMENTS

| 9,838,481 B2* | 12/2017 | Draznin | H04L 67/303 |
| 2015/0372908 A1* | 12/2015 | Kashyap | H04L 69/161 |
| | | | 370/392 |
| 2017/0149665 A1* | 5/2017 | Yousaf | H04L 47/32 |
| 2018/0115548 A1* | 4/2018 | Edsall | H04L 12/462 |
| 2019/0379604 A1* | 12/2019 | Li | H04L 47/18 |
| 2020/0127983 A1* | 4/2020 | Asghar | H04L 12/4641 |
| 2020/0322837 A1* | 10/2020 | Mihály | H04L 47/115 |

* cited by examiner

*Primary Examiner* — Chi H Pham
*Assistant Examiner* — Weibin Huang

(57) ABSTRACT

Techniques for reducing network congestion are disclosed. In one embodiment, a method is disclosed comprising receiving, by a computing device, a packet from a sender over a network; retrieving, by the computing device, congestion information; inserting, by the computing device, congestion data representing the congestion information into a header option of the packet to generate an augmented packet; transmitting, by the computing device, the augmented packet to a receiver; receiving, by the computing device, a response packet, the response packet including the congestion data; and transmitting, by the computing device, the response packet to the sender.

20 Claims, 10 Drawing Sheets

TRANSPARENT QUANTITATIVE CONGESTION CONTROL

BACKGROUND INFORMATION

Network congestion in a packet data network (PDN) occurs when one or more network elements receives more data than it can process in a timely manner. Often, such network elements may drop packets, block connections, or take other actions in response to congestion. All of these actions ultimately negatively impact the throughput of the PDN.

DETAILED DESCRIPTION OF EXAMPLE EMBODIMENTS

Figure 1:
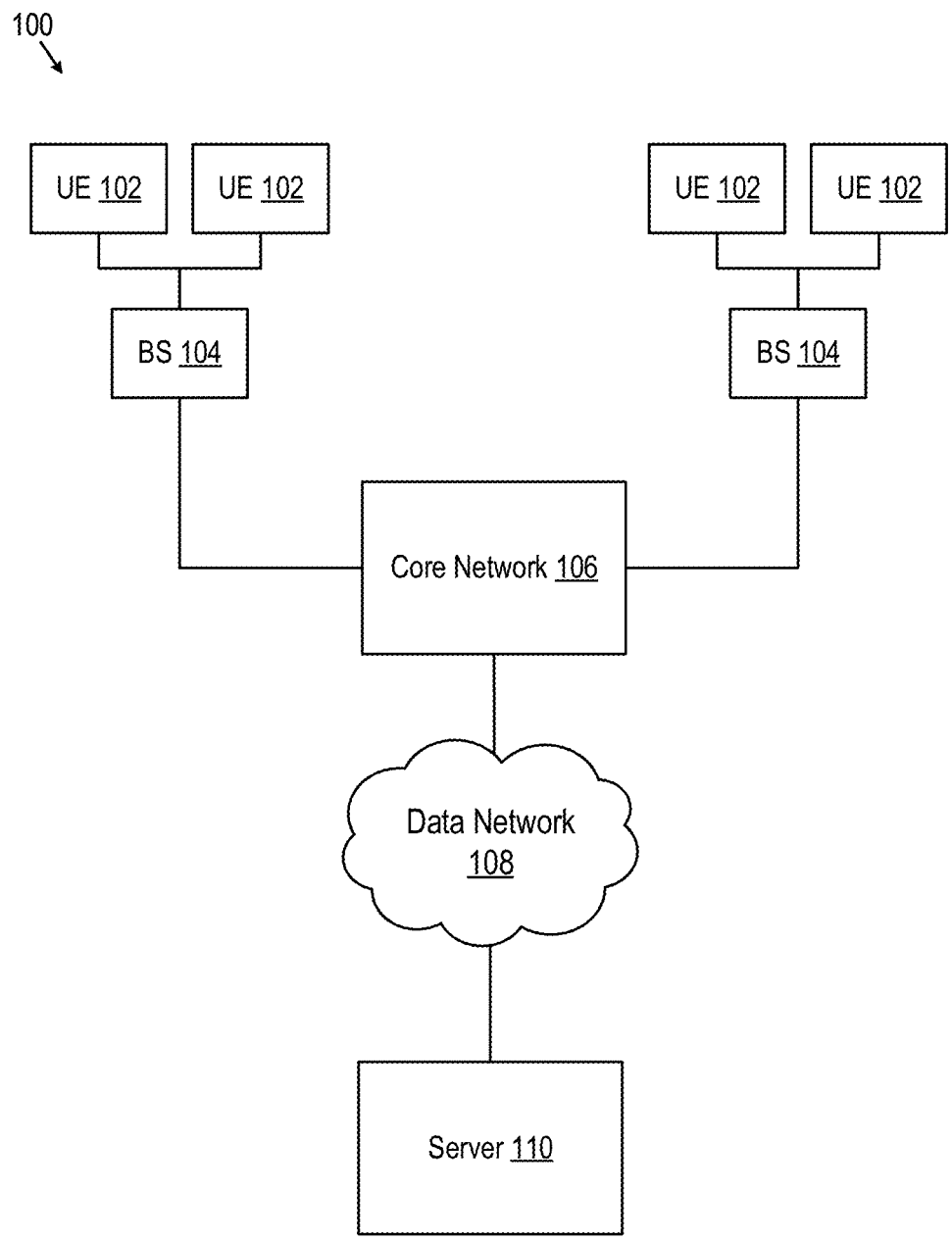
FIG. 1 is a block diagram illustrating a cellular network according to some embodiments of the disclosure.

The disclosed embodiments monitor the status of network elements and augment packets with congestion data within a network.

In general, TCP-based applications may experience degraded performance over "long fat" links (e.g., 5G non-access stratum links) with large bandwidth-delay products (BDP). In order to fully utilize link capacity, a TCP sender may have to fill the link with a large amount of unacknowledged data. Although filling the link with a large amount of data may improve network link utilization, a large amount of unacknowledged data could also cause congestion in bottleneck devices (e.g., cellular base stations), especially for heavily loaded network devices (e.g., cellular base stations) in a congested area. If network devices can not resolve congestion promptly, eventually congestion will cause "buffer bloat" in these devices, trigger large amounts of retransmissions, and reduce end-to-end application layer throughputs.

Many techniques to address congestion in PDNs are passive techniques, relying on inferring congestion in the PDN. These techniques may be less accurate and oftentimes actively encourage congestion before initiating mitigating action. Some alternative techniques may actively detect congestion but rely on additional protocols or hardware to support this detection. These techniques thus require the cooperation of all network elements and are generally infeasible in all but the simplest of networks.

Various proposals to resolve congestion inside network devices may utilize different active queue management (AQM) schemes so that network devices can discard packets before congestion occurs. For instance, some cellular base stations may start to discard packets that are enqueued inside their transmission buffer longer than a preset threshold using, for example, an AQM discard timer. However, dropping packets from protocols with retransmission mechanisms such as TCP and QUIC/HTTP3 may trigger large amounts of retransmissions. Further, under certain conditions, AQM dropping would not relieve congestion but make congestion even worse.

In order to resolve issues introduced by AQM and other dropping-based traffic management methods, other protocols have been proposed to send end-to-end notification of network congestion without dropping packets, such as eXplicit Congestion Control Protocol (XCP) and Explicit Congestion Notification (ECN). However, these methods fall short. XCP requires TCP/IP stack modification in end devices, and ECN requires support from end devices as well as underlying network infrastructure. Modification of an existing network stack and requiring support from the underlying network limit implementation. Thus, even modern cellular networks do not support XCP and ECN.

Moreover, since ECN only uses two bits in IP headers, packets can only be classified into two categories: non-congested ("ECT") (represented as binary 01 or 10) and congested ("CE") (represented as binary "11"). Thus, an ECN scheme cannot be used to transmit quantitative congestion information, and TCP end hosts cannot adjust their sending rate precisely, even after receiving the congestion signal.

The disclosed embodiments embed congestion data representing congestion information within an existing header format of the packet. In some embodiments, the congestion data is stripped from the packets before the packets reach the senders and receivers. Thus, congestion management operations are transparent to senders and receivers of packets.

More specifically, methods, computer-readable media, devices, and systems are disclosed that operate to augment data packets with congestion data. In brief, a congestion probe receives a packet from a sender over a network and retrieves congestion information from its existing queue management routines. The congestion probe may then selectively insert congestion data representing the congestion information into a header option of the packet to generate an augmented packet and transmits the augmented packet to a receiver (potentially through intermediate devices, most notably, a reflector). After the receiver handles the data packet, the congestion probe ultimately receives a response packet including the congestion data and transmits the response packet to the sender (through an intermediary device, namely, an enforcer).

In some embodiments, the congestion probe can automatically insert the congestion data into the header option when no other header options in the packet are set. Alternatively, or in conjunction with the foregoing, the congestion probe can automatically insert the congestion data into the header option when a selective acknowledgment (SACK) option is not set and at least one other header option is set. In some embodiments, the congestion probe can randomly determine whether to insert congestion data into a header when a SACK option is set. In these embodiments, the congestion probe can generate a random value and determine if the random value is above or below a pre-set probability threshold value. When the congestion probe determines that the random number exceeds a threshold, it can then replace the SACK option with the congestion data. These, and other embodiments, may describe a conditional or selective insertion mechanism such that congestion data is only added to a subset of all packets in some embodiments.

Additionally, the congestion probe may also be configured to recalculate an error detection code field after inserting the congestion data and replace a previous error detection code field present in the packet, thus ensuring that downstream devices can validate the packet. In some embodiments, this recalculating may comprise computing a cyclical redundancy check (CRC) using at least in part the congestion data as an input.

As discussed in more detail herein, the system may also include reflector and enforcer devices situated at the edges of the network nearest to a sender and receiver. In one embodiment, the reflector is configured to strip the congestion data from the augmented packet to reconstruct an original packet and cache the congestion data. The reflector may then transmits the original packet to the receiver and await a response packet. Upon receiving the response packet, the reflector may retrieve the congestion data associated with the response packet and the original packet and augment the response packet with the congestion data. Ultimately, the reflector "reflects" this congestion data back to the congestion probe and ultimately to the enforcer.

In an embodiment, the enforcer is configured to receive the response packet that includes the congestion data and strip the congestion data from the response packet to reconstruct the original response packet. The enforcer may perform two operations in parallel. First, the enforcer may shape network traffic based on the congestion data. Second, the enforcer may transmit the original response packet to the sender, where the original response packet does not include the congestion data.

The disclosed embodiments thus transmit precise (or quantitative) congestion data from bottleneck devices (e.g., cellular base stations) to the endpoints or traffic shaping devices without modification of the end hosts. The disclosed embodiments offer numerous advantages over existing congestion management schemes including, but not limited to relieving congestion especially at a heavily loaded area, improving "goodput" (i.e., application-layer throughput) without triggering retransmissions, and reducing packet dropping rates (especially for heavy loaded network device with AQM such as cellular base stations).

FIG. 1 is a block diagram of a cellular network 100 according to some embodiments of the disclosure.

In cellular network 100, UE (102) accesses a data network (108) via one or more base station (BS) devices (104) (individually or collectively BS 104) devices and a core network (106). In the illustrated embodiment, UE (102) comprises any computing device capable of communicating with a BS device (104). As examples, UE (102) may include mobile phones, tablets, laptops, sensors, Internet of Things (IoT) devices, and any other devices equipped with a wireless transceiver. One example of a UE is provided in FIG. 6.

In cellular network 100 BS device (104) forms a network allowing over-the-air network communication with UE (102). In general, BS device (104) is communicatively coupled to the core network (106) and wirelessly coupled to UE (102).

In one embodiment, BS device (104) forms a fifth-generation (5G) cellular access network. In one embodiment, each BS device (104) and UE (102) comprise a NextGen Radio Access Network (NG-RAN). In an embodiment, each BS device (104) comprises a next generation Node B (gNodeB) base station connected to UE (102) via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (102). The gNodeB may additionally include multiple network interfaces for communicating with the core network (106). In one embodiment, the gNodeB includes an interface to communicate with a mobility manager (e.g., an Access and Mobility Management Function, AMF) and a second interface to communicate with one or more gateway elements in the core network (106) such as a Session Management Function (SMF) for control data or a User Plane Function (UPF) for user data. In one embodiment, the mobility manager manages control plane traffic while the gateway elements manage user data traffic, as will be discussed. In some embodiments, the BS devices (104) are communicatively connected. For example, in a 5G network, individual gNodeB devices can be communicatively coupled via an X2 interface.

In another embodiment, the BS devices (104) comprise a fourth-generation (4G) cellular access network. In some embodiments, the BS devices (104) comprise a long-term evolution (LTE) access network. In one embodiment, the BS devices (104) and UE (102) comprise an Evolved Universal Mobile Telecommunications System (UMTS) Terrestrial Radio Access Network (E-UTRAN). In an embodiment, each BS device (104) comprises an Evolved Node B (eNodeB) base station connected to UE (102) via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (102). The eNodeB may additionally include multiple network interfaces for communicating with the core network (106). In one embodiment, the eNodeB includes an interface to communicate with a mobility manager (e.g., a Mobility Management Entity, MME) and a second interface to communicate with one or more gateway elements in the core network (106) such as a Serving Gateway (S-GW) or Packet Data Network Gateway (P-GW). In one embodiment, the mobility manager manages control plane traffic while the gateway elements manage user data traffic, as will be discussed. In some embodiments, the BS devices (104) are communicatively connected. For example, in a 4G network, individual eNodeB devices can be communicatively coupled, for example, via an X2 interface or any other interface.

In an embodiment, the BS devices (104) provide access to a core network (106) to the UE (102). In the illustrated embodiment, the core network (106) may be owned and/or operated by a mobile network operator (MNO) and provides wireless connectivity to UE (102). In the illustrated embodiment, this connectivity may comprise voice and data services. The core network (106) includes various computing devices, which are described briefly herein. Further detail of such devices is provided in FIG. 2.

At a high-level, the core network (106) may include a user plane and a control plane. In one embodiment, the control plane comprises network elements and communications interfaces to allow for the management of user connections and sessions. The user plane may comprise network elements and communications interfaces to transmit user data from UE (102) to elements of the core network (106) and to external network-attached elements in a data network (108) such as the Internet. An example of a control plane function comprises authenticating that a user is able to access the core network (106) (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network (106) may include a mobility manager, one or more gateways (e.g., a serving gateway and packet gateway), and a subscriber database. In practice, the core network (106) may include more or less components than these.

In a 5G network, the mobility manager may be implemented by an AMF, SMF, and an Authentication Server Function (AUSF). Specifically, the AMF performs mobility management while the SMF performs session management, both of which are described herein. Further, the AUSF may obtain authentication vectors from a subscriber database. In a 4G network, the mobility manager may be implemented by an MME, a serving gateway by an S-GW, a packet gateway by a P-GW, and a subscriber database by a home subscriber server (HSS).

The serving gateway in a 5G network may be implemented by the SMF as well. Specifically, packet routing from the base station to the packet gateway may be handled by the SMF in contrast to the S-GW in a 4G network. In a 5G network, the packet gateway may be implemented by the UPF, which provides packet routing from the serving gateway to external services and manages Internet Protocol (IP) address allocation as well as content filtering and blocking. In a 5G network, the subscriber database may be implemented by a Unified Data Repository (UDR), which stores the subscriber data. Access to the UDR may be mediated by Unified Data Management (UDM), which is part of the subscriber database, as described herein.

In brief, a UE (102) may communicate with the mobility manager to authenticate and establish a session or bearer with the serving and packet gateways. The mobility manager accesses the subscriber data to confirm the UE (102) identity and communicates with the serving gateway to establish the session. Once established, the UE (102) transmits data requests through the session to the packet gateway, which manages the transmitting and receiving data to and from external network services. Specific details of these elements are provided in the following figures.

Figure 2:
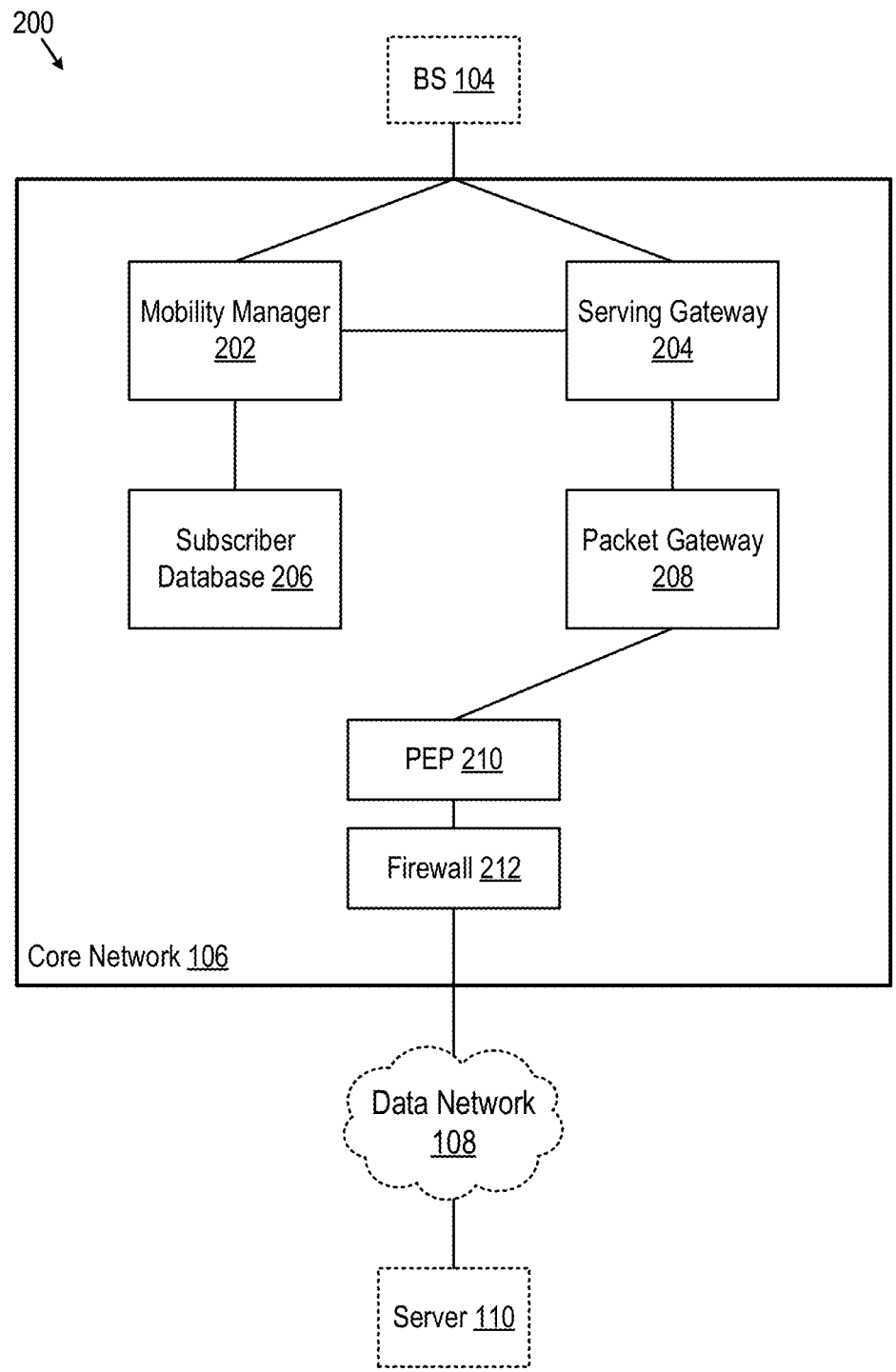
FIG. 2 is a block diagram illustrating a core network of a cellular network according to some embodiments of the disclosure.

FIG. 2 is a block diagram illustrating a core network 200 of a cellular network according to some embodiments of the disclosure.

In the illustrated embodiment, UE (not illustrated) access core network (106) and data network (108) via one or more base stations such as base station (104).

In one embodiment, the base station (104) comprises a 5G gNodeB base station connected to UE via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE. The gNodeB additionally includes multiple network interfaces for communicating with the core network and, specifically, mobility manager (202) and serving gateway (204). In one embodiment, the mobility manager (202) in a 5G network comprises an AMF. In one embodiment, the serving gateway (204) comprises an SMF for control data or UPF for user data.

In another embodiment, a base station (104) comprises a 4G eNodeB base station connected to UE via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE. The eNodeB additionally includes multiple network interfaces for communicating with the core network and, specifically, mobility manager (202) and serving gateway (204). In one embodiment, the mobility manager (202) comprises an MME in a 4G network.

In the illustrated embodiment, the mobility manager (202) manages control plane traffic while the gateway elements (204, 206) manage user data traffic. Specifically, the mobility manager (202) may comprise hardware or software for handling network attachment requests from UE. As part of processing these requests, the mobility manager (202) accesses a subscriber database (206). The subscriber database (206) comprises hardware or software that stores user authorization and authentication data and validates users to the network. In some embodiments, the subscriber database (206) may comprise a UDM and UDR in a 5G network. In other embodiments, the subscriber database (206) may comprise an HSS in a 4G network. In one embodiment, the subscriber database (206) may also store a location of the user updated via a Diameter or similar protocol.

The mobility manager (202) may also be configured to create data sessions or bearers between UE and serving gateway (204) or packet gateway (208). In one embodiment, the serving gateway (204) and packet gateway (208) may comprise single or separate devices. In general, the serving gateway (204) routes and forwards user data packets while also acting as the mobility anchor for the user plane during access point handovers and as the anchor for mobility between different network technologies. For idle state UE, the serving gateway (204) terminates the downlink data path and triggers paging when downlink data arrives for the UE. The serving gateway (204) manages and stores UE contexts, e.g., parameters of the IP bearer service, network internal routing information. In a 5G network, the serving gateway (204) may be implemented by an SMF. In a 4G network, the serving gateway (204) may be implemented by an S-GW.

The serving gateway (204) is communicatively coupled to a packet gateway (208). In general, the packet gateway (208) may provide connectivity from the UE to external PDNs such as data network (108) via a performance-enhancing proxy (PEP) (210) and firewall (212). UE may have simultaneous connectivity with more than one packet gateway (208) for accessing multiple packet data networks. The packet gateway (208) performs policy enforcement, packet filtering for each user, charging support, lawful interception, and packet screening. In a 5G network, the packet gateway (208) may be implemented by a UPF. In a 4G network, the packet gateway (208) may be implemented by a P-GW.

In the illustrated embodiment, PEP (210) may comprise one or more network devices configured to improve the end-to-end performance of data traffic entering and exiting the core network (106). In some embodiments, PEP (210) implements standard performance-enhancing techniques such as those defined in Internet Engineering Task Force (IETF), or other similar performance-enhancing functionalities. Additionally, the PEP (210) may implement some of the method embodiments described herein. For example, the PEP (210) may implement the functionality of the enforcer (308) described in connection with FIGS. 3A through 3C and FIG. 4, as well as the traffic shaping processes described in connection with FIG. 5C.

In the illustrated embodiment, the core network (106) additionally may include a firewall (212) that operates as the egress and entry point of data traffic transmitted over the data network (108). In general, the firewall (212) may allow or disallow traffic to and from the core network (106). Various firewall technologies may be used to implement the firewall (212), and the disclosure is not limited to a specific type of firewall.

Figure 3A:
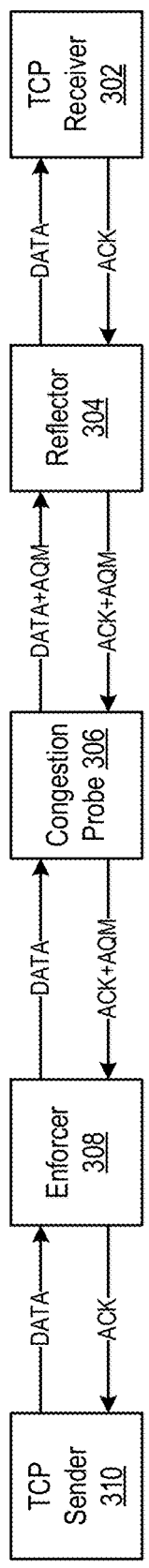
FIGS. 3A through 3C are block diagrams illustrating functional components of a cellular network that provide congestion control according to some embodiments of the disclosure.
Figure 3B:
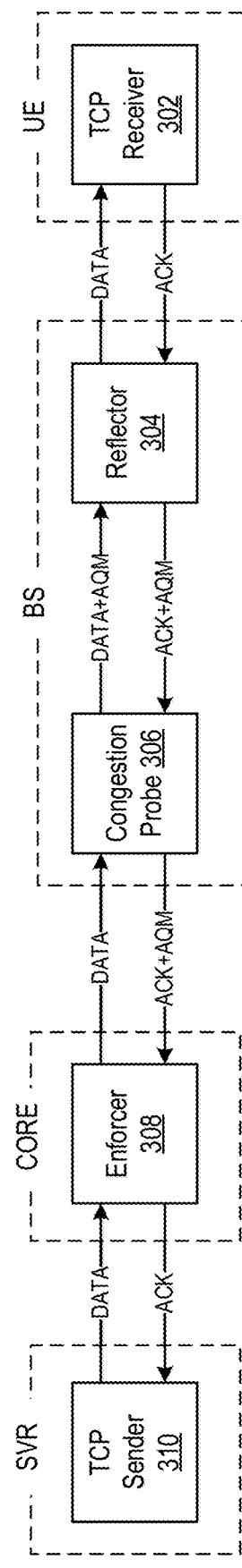
Figure 3C:
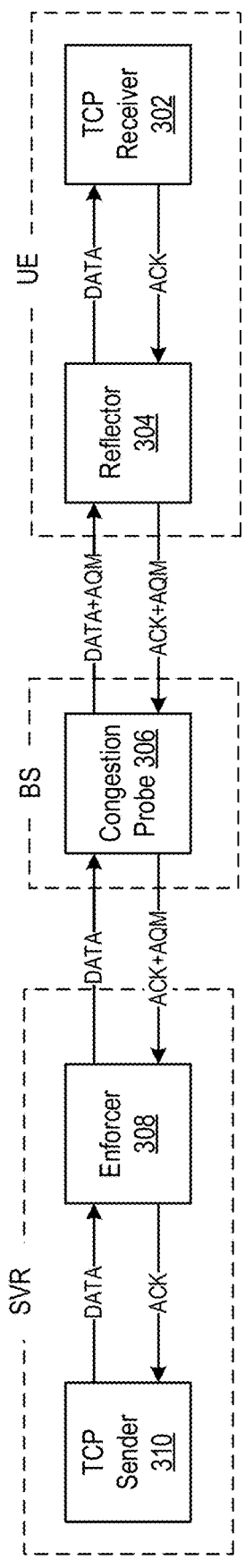

FIGS. 3A through 3C are block diagrams illustrating functional components of a cellular network that provide congestion control according to some embodiments of the disclosure. FIGS. 3A through 3C depict various elements that are identically number; the description of such identically numbered elements apply equally to all FIGS. 3A through 3C.

The systems in FIGS. 3A through 3C includes a transmission control protocol (TCP) receiver (302) and a TCP sender (310). In some embodiments, protocols other than TCP may be used, and TCP is illustrated as an example only. Further, in the illustrated embodiment and other embodiments, other protocols (e.g., HTTP) may be used in conjunction with TCP or similar protocols. In general, TCP receiver (302) may comprise a computing device capable of receiving TCP packets from TCP sender (310). Correspondingly, TCP sender (310) comprises any computing device that can transmit TCP packets to the TCP receiver (302). In one embodiment, TCP receiver (302) may comprise UE, such as UE (102). In one embodiment, TCP sender (310) may comprise a computing device such as a server (110). This arrangement is illustrated in FIGS. 3B and 3C. In some embodiments, TCP receiver (302) may comprise a server computing device such as a server (110), and TCP sender (310) may comprise UE, such as UE (102).

In the illustrated embodiments, reflector (304), congestion probe (306), and enforcer (308) are communicatively situated between TCP sender (310) and TCP receiver (302). In one embodiment, reflector (304), congestion probe (306), and enforcer (308) form a communications path between TCP sender (310) and TCP receiver (302). In one embodiment, reflector (304), congestion probe (306), and enforcer (308) are all logical devices installed within a cellular network. For example, in FIG. 3B, reflector (304) and congestion probe (306) may be installed within a base station (e.g., BS device 104) while enforcer (308) may be installed within a core network (e.g., within PEP 210). In an alternative embodiment, the logical functions of the reflector (304), congestion probe (306), and enforcer (308) may be distributed across the UE and server. For example, in FIG. 3C, the UE is configured to implement the reflector (304), the congestion probe (306) is installed within a base station, and the enforcer (308) is installed within a server (or data center). In this manner, the core network is unchanged, and all functionality is pushed to the "edges" of the network. As can be seen, the functionality of the reflector (304), congestion probe (306), and enforcer (308) may be installed in varying locations based on the needs of the system. To wit, the reflector (304), congestion probe (306), and enforcer (308) may be implemented as dedicated hardware devices, may be implemented in software, and or a combination of both, and deployed on existing hardware devices in the respective components.

In the illustrated embodiments, data is transmitted by a TCP sender (310) to the enforcer (308). In the illustrated embodiment, the enforcer (308) comprises a software or hardware module that is configured to reduce the transmitting rate in response to congestion data. In the illustrated embodiment, the enforcer (308) receives congestion data as part of a TCP acknowledgment (ACK) message. In other embodiments, AQM information may be included in other packet types. In one embodiment, the AQM information may be generated by an active queue (AQ) algorithm, such as a Random Early Detection (RED) algorithm. In some embodiments, the AQM information includes data related to a buffer used to store incoming packets, such as available buffer size, total buffer size, used buffer size, etc. The AQM information may also include probability data such as a drop probability, which represents the likelihood that an incoming packet will be dropped and not enqueued into a buffer. As will be described, these parameters may be generated by the AQ algorithm and re-used to generate congestion information.

While AQM is used in the following descriptions, other types of congestion information may be utilized, and the disclosure is not limited specifically to AQM information. As illustrated in FIG. 3B, the enforcer (308) may be implemented in a core network of a cellular network. For example, the enforcer (308) may be implemented in a PEP of a core network. In an embodiment, the enforcer (308) may also be configured to remove congestion data from a response packet prior to forwarding the packet to, for example, TCP sender (310). Further, as discussed herein, the enforcer (308) may consume the congestion data to shape network traffic. Thus, in an embodiment, there is no change to the TCP transmission mechanics from the viewpoint of the TCP sender (310). In an alternative embodiment, illustrated in FIG. 3C, the enforcer (308) may be implemented in a TCP sender (310) device or system. In an embodiment, the TCP sender (310) receives the congestion data as well as the carrier packet (e.g., ACK packet).

In the illustrated embodiments, the enforcer (308) forwards data sent by the TCP sender (310) to the congestion probe (306). In the illustrated embodiment, the congestion probe (306) comprises a software or hardware module that is configured to collect congestion information (e.g., AQM information) from bottleneck devices on the network. In the illustrated embodiments, the congestion probe (306) is further configured to enrich header data with collected congestion data representing the congestion information along the data stream. In general, the congestion probe (306) is embedded in a bottleneck device (i.e., a device that may cause significant congestion in the network). In a cellular network, the congestion probe (306) may be installed within a base station, as illustrated in both FIGS. 3B and 3C. As seen in FIGS. 3B and 3C, in the downstream direction (i.e., from TCP sender 310 to TCP receiver 302), the congestion probe (306) inserts congestion data representing the congestion information into the data stream, e.g., in TCP headers. In some embodiments, since the majority of data is transmitted in the downstream direction, the congestion data is determined and inserted in this process. However, in other networks where the majority of data is transmitted in the uplink direction (i.e., from TCP receiver 302 to TCP sender 310), the congestion probe (306) may insert congestion data during uplink transmissions. In some embodiments, the congestion probe (306) may insert congestion data in both directions or may programmatically determine whether to insert congestion data in the uplink or downlink directions (e.g., depending on how the network is being utilized). In the illustrated embodiment, in the uplink direction, the congestion probe (306) forwards TCP packets (e.g., ACK packets) populated with congestion data without changing the headers. Such forwarding may be performed in the opposite direction from the direction whereby congestion data is added to a packet.

The congestion probe (306) forwards the data and the congestion data to the reflector (304). In the illustrated embodiment, the reflector (304) may comprise a software or hardware module that is configured to reflect congestion data back to the TCP sender (310). In the illustrated embodiment, most data is transmitted to the TCP receiver (302). Thus, the reflector (304) receives the congestion data, strips the congestion data, and temporarily stores the congestion data. Then the reflector (304) transmits the original data stream to the TCP receiver (302). When the TCP receiver (302) returns an ACK message, the reflector (304) can retrieve the congestion data associated with the data that triggered the ACK and can populate the ACK message with the corresponding congestion data. As illustrated in FIG. 3B, in one embodiment, the reflector (304) may be implemented with the congestion probe (306) in a cellular base station. However, in another embodiment, illustrated in FIG. 3C, the reflector (304) may be implemented on UE. In both embodiments, the ultimate networking software implemented on the UE may be unchanged. For example, when the reflector (304) is implemented on a UE, the reflector (304) may intercept traffic prior to being received by application software (e.g., as an initial pre-processing stage of network traffic). When implemented in a base station, the reflector (304) removes congestion data prior to sending to UE, thus not requiring any changes on the UE.

In the illustrated embodiments, after the reflector (304) augments the ACK message with the congestion data, the reflector (304) transmits the ACK message and congestion data to the congestion probe (306). In the illustrated embodiments, the congestion probe (306) forwards the ACK message and congestion data to the enforcer (308). The enforcer (308) removes the congestion data and, if necessary, shapes traffic based on the detected congestion. The enforcer (308) then forwards the ACK message without congestion data back to the TCP sender (310). Thus, the ultimate TCP sender (310) and TCP receiver (302) may be unaware of the congestion operations due to the stripping of congestion data by the reflector (304) and enforcer (308).

Figure 4:
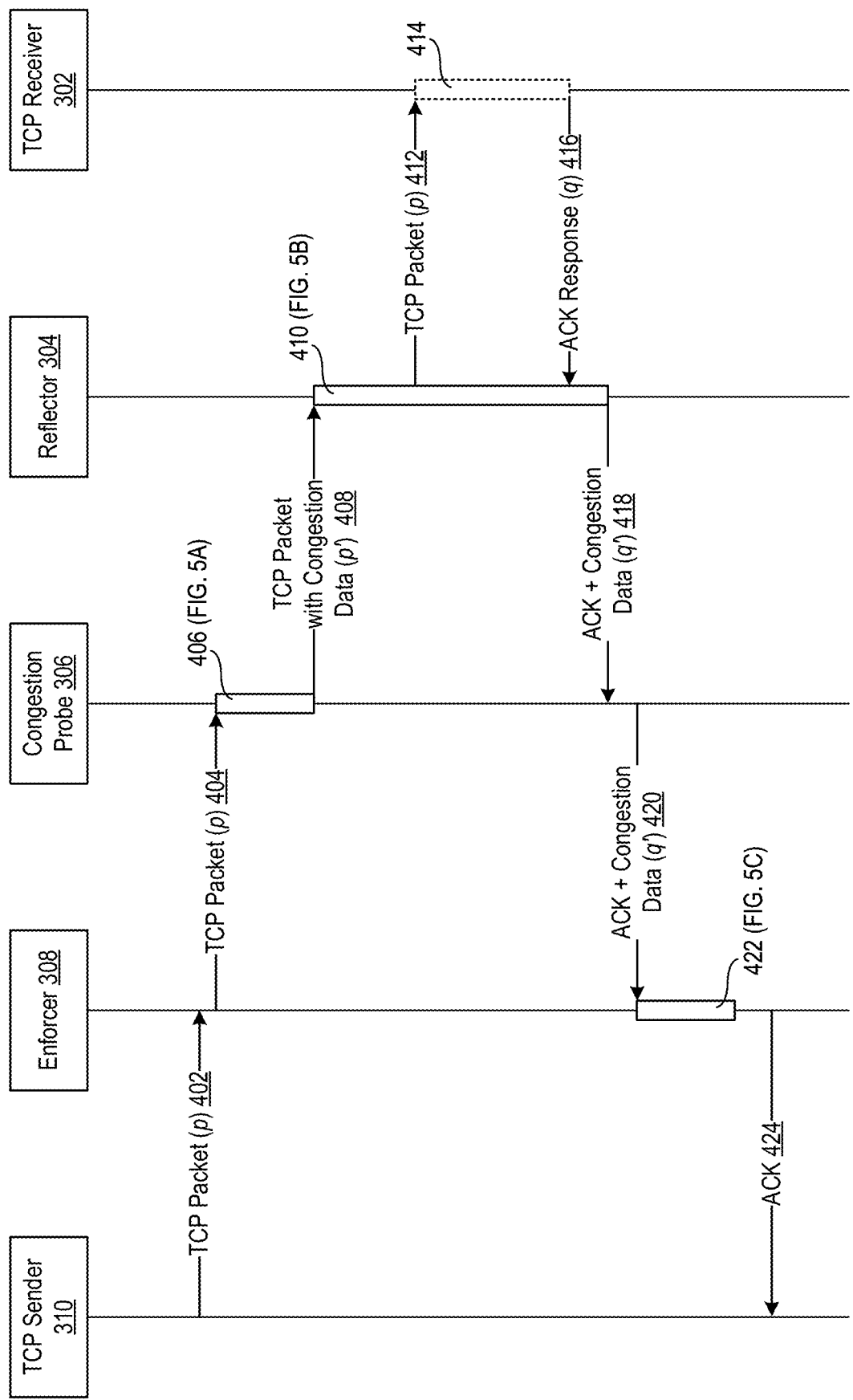
FIG. 4 is a call flow diagram illustrating a method for providing congestion control in a network according to some embodiments of the disclosure.

FIG. 4 is a call flow diagram illustrating a method for providing congestion control in a network according to some embodiments of the disclosure.

In step 402, a TCP sender (310) device transmits a packet (e.g., a TCP packet) to an enforcer (308). In the illustrated embodiment, the TCP sender (310) device may comprise any device capable of sending TCP packets and requires no changes to support congestion management. For example, the TCP sender (310) may comprise a server such as server (110). In the illustrated embodiment, the standard TCP packet is denoted as packet p. TCP packet p can include any data and header options supported by the TCP protocol.

In step 404, the enforcer (308) forwards the TCP packet p, unchanged, to a congestion probe (306). In the illustrated embodiment, the enforcer (308) may only take action in response to ACK TCP packets (returned by TCP receiver 302) and thus simply forwards transmitted non-ACK packets received from the TCP sender (310) to the receiver (302) (via reflector 304 and congestion probe 306, as will be discussed).

In step 406, the congestion probe (306) receives the TCP packet p. In response, the congestion probe (306) determines whether to annotate the TCP packet p with congestion data and, if so, adds congestion data to the TCP packet p. The original TCP packet p, annotated with congestion data, is denoted as TCP packet p'. Examples of this step are provided in further detail in FIG. 5A. In some embodiments, the congestion probe (306) may selectively add congestion data in a random or pseudo-random manner. This operation is described in more detail in the examples provided in connection with FIG. 5D.

In step 408, the congestion probe (306) sends the annotated TCP packet p' to the reflector (304).

In step 410, the reflector (304) strips the congestion data from the TCP packet p'. In the illustrated embodiment, the reflector (304) may cache the stripped congestion data and await an ACK message from the TCP receiver (302). Examples of this step are provided in further detail in FIG. 5B.

In step 412, the reflector (304) transmits the original TCP packet p to the TCP receiver (302). Notably, the data transmitted between the reflector (304) and the TCP receiver (302) does not include any congestion data. Thus, the TCP receiver (302), which may comprise a device such as UE or receiving software on such a device, receives standard TCP packets.

In step 414, the TCP receiver (302) processes the TCP packet. No limitation is placed on the type of processing performed in step 414, and, indeed, any type of processing may be performed.

In step 416, after processing the TCP packet, the TCP receiver (302) returns an acknowledgment (ACK) response packet denoted as q. In a TCP network, ACK packets are used to confirm receipt of packets (e.g., p) to the TCP sender (310). In the illustrated embodiment, the TCP receiver (302) transmits its ACK packets to the reflector (304).

As illustrated, step 410 finishes execution when receiving a corresponding ACK packet q to the TCP data packet p. In one embodiment, step 410 includes retrieving cached congestion data corresponding to the TCP data packet p corresponding to the ACK packet q. In some embodiments, this may be accomplished by matching the sequence number in the ACK packet q with a sequence number of the data packet p. In step 410, the reflector (304) then adds the congestion data to the ACK packet q; the annotated ACK packet q is denoted as q'.

In step 418, the reflector (304) transmits the annotated ACK packet q' back to the congestion probe (306). In the illustrated embodiment, the congestion probe (306) does not perform any translation on the ACK packet q'. Thus, in step 420, the congestion probe (306) forwards the ACK packet q' to the enforcer (308).

In step 422, the enforcer (308) receives the augmented ACK packet q' and strips the congestion data from the packet. In some embodiments, the enforcer (308) will analyze the congestion data and determine whether to modify or shape the traffic sent over the network based on bottleneck (e.g., base station) congestion. Examples of this step are provided in further detail in FIG. 5C.

In step 424, after stripping the congestion data, the enforcer (308) then transmits the ACK message q back to the TCP sender (310). completing the transmission and acknowledgment of a sequence number in a TCP session. In the illustrated embodiment, since the ACK message q in step 424 does not include congestion data, from the perspective of the TCP sender (310). the network is implementing a standard TCP protocol. Nevertheless, the congestion data may be used internally to shape traffic in the network without requiring modification of TCP endpoints.

Figure 5A:
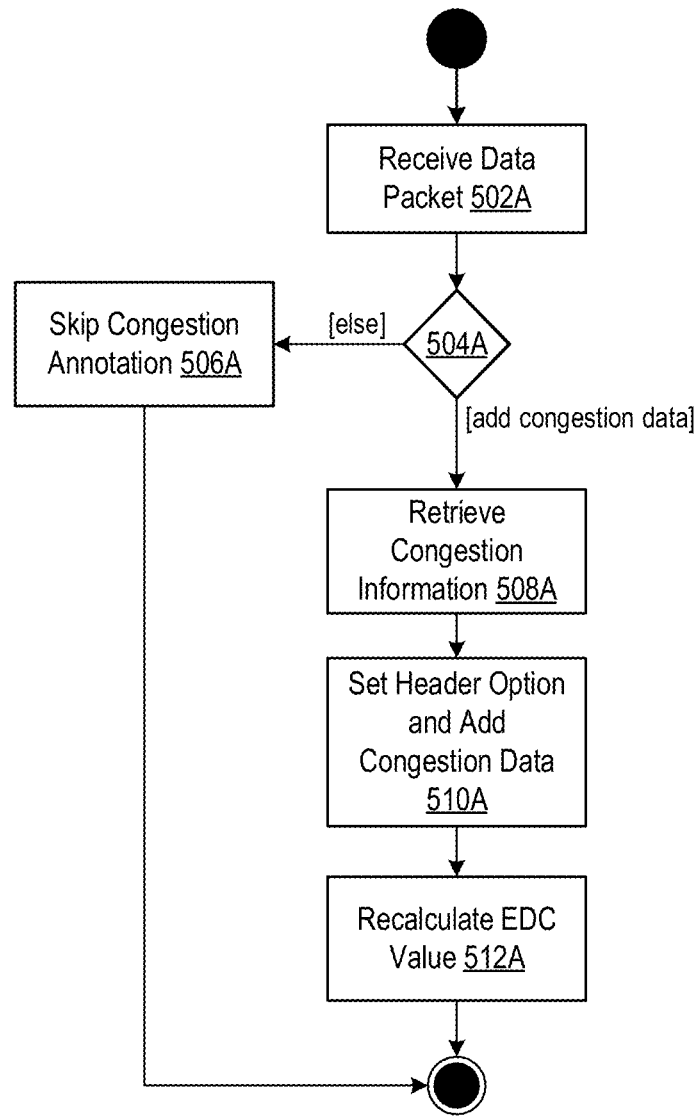
FIG. 5A is a flow diagram illustrating a method for annotating a data packet with congestion data according to some embodiments of the disclosure.

FIG. 5A is a flow diagram illustrating a method for annotating a data packet with congestion data according to some embodiments of the disclosure. In some embodiments, the method of FIG. 5A may be performed by a congestion probe (306). In some embodiments, the method of FIG. 5A may be performed by a cellular base station device (104).

In step 502A, the method may receive a data packet. In some embodiments, the data packet comprises a network packet. In some embodiments, the network packet comprises a TCP packet. In some embodiments, the data packet includes a header and, optionally, data. In one embodiment, the form of the header comprises the header described in connection with FIG. 6. In some embodiments, the data packet may be received over a network. In some embodiments, the network comprises a packet-switched data network. In some embodiments, the network may comprise a core network of a cellular network.

In step 504A, the method may determine whether to augment the data packet with congestion data representing the congestion information. In one embodiment, the method selectively adds congestion data to data packets and thus does not add congestion data to all packets. The embodiments of FIG. 5D provide details on how the method determines whether to augment a data packet with congestion data in some embodiments. In brief, the method inspects the header of the data packet and determines one or more conditions are met based on the format of the header. If the method determines that the header meets the predefined conditions, the method determines that congestion data should be added. If not, the method does not add congestion data.

In step 506A, if the method determines not to augment the data packet, the method may skip augmenting the data packet with the congestion data. For example, if the method determines that a TCP data packet includes a SYN flag, the method skips the addition of congestion data since this packet is used for a three-way handshake to initiate the TCP session. Similarly, the method may selectively only augment a certain percentage of TCP data packets that include a SACK option in the TCP options field. In any event, if the method determines not to add congestion data, the method forwards the un-augmented data packet to the recipient (e.g., TCP receiver). In some embodiments, the method may forward the data packet to an intermediary device upstream from the TCP recipient.

In step 508A, if the method determines to augment the data packet, the method may retrieve congestion information.

Congestion information may comprise any data that describes the congestion of a network from the perspective of the device implementing the method (e.g., a congestion probe). In some embodiments, the method is implemented in a router or switch, and the congestion information comprises AQM information. In some embodiments, a buffer is used to buffer incoming data packets. The AQM information describes the state of the buffer at any given moment. For example, the AQM information may include an available buffer size. In this example, the available buffer size comprises the amount of free space in the buffer of the network device for receiving incoming packets. In general, the free space is indicative of the likelihood of dropping packets since free space may be used to buffer new packets. Alternatively, or in conjunction with the foregoing, the AQM information may include a drop probability represented as, for example, a 32-bit floating-point value. In one embodiment, the drop probability may calculate the queue management routine implemented by the device implementing the method. For example, when using a RED method, the network device may calculate a drop probability based on the average queue/buffer length. This calculated drop probability may be used as some or all of the congestion information.

Continuing the example of RED, when an incoming data packet is received, a RED implementation will calculate an average queue length (AVG). The RED algorithm may also define two breakpoints: a minimum queue length (MIN) and a maximum queue length (MAX). When AVG<MIN, the RED algorithm will enqueue the packet; thus, the drop probability will be set to zero. When AVG>MAX, the RED algorithm will drop the packet; thus, the drop probability will be set to one. When the value of AVG is between MIN and MAX (MIN≤AVG≤MAX), the RED algorithm will calculate a drop probability between zero and one; thus, in this scenario, the calculated drop probability will be used in the congestion information. In all scenarios, the value of AVG may be subtracted from a fixed queue size to determine the available buffer size. In some embodiments, a classical RED algorithm may be used. However, weighted RED (WRED), adaptive RED (ARED), robust RED (RRED), or another algorithm may also be used.

In step 510A, the method may set a header option in the header of the data packet and add congestion data representing the congestion information to the header option to augment the data packet with congestion data. As used herein, congestion data may be generated based on congestion information. Specifically, congestion information may comprise any data representing the congestion of a bottleneck device. In some embodiments, the congestion data is equal to the congestion information. In other embodiments, the method may modify or otherwise manipulate the congestion information to generate congestion data based on the congestion information. For example, the method may only select a subset of the congestion information to use as the congestion data. As another example, the method may re-format the congestion information to generate congestion data. In general, congestion information may comprise congestion information generated by a device and congestion data refers to data representing that congestion information that is inserted into a packet.

In one embodiment, the method uses an options field (622) of a TCP header to insert the header option. In one embodiment, the method sets a kind field of the header option to a preconfigured value (e.g., 60) and computes the length of the congestion data. In one embodiment, the method concatenates all congestion data and computes the length. The method then uses this length as the length of the option. The method then adds the congestion data after the length field to form the complete option. Finally, the method inserts the congestion option into the TCP header in a designated field (e.g., options field 622).

In step 512A, the method recalculates an error detection code (EDC) value. In one embodiment, the EDC comprises a CRC code. In one embodiment, the method computes the CRC using some or all of the data packet header and data. In one embodiment, the EDC is calculated using the congestion header option in addition to one or more other fields of the header and data. In this manner, a new EDC value is created that differs from the EDC value in the original packet, the new EDC value reflecting the addition of the congestion option and allowing downstream devices to detect errors or confirm the fidelity of the data packet. In one embodiment, the method replaces an existing EDC value with the newly generated EDC value.

In the illustrated embodiment, since the congestion option is inserted into a variable length, standardized field, the data packet header will conform to existing standards (e.g., TCP) and does not require changes to network protocol handlers on downstream devices. This congestion data can then be used by downstream network devices and ultimately reflected back to an enforcer device to shape network traffic, as will be discussed.

Figure 5B:
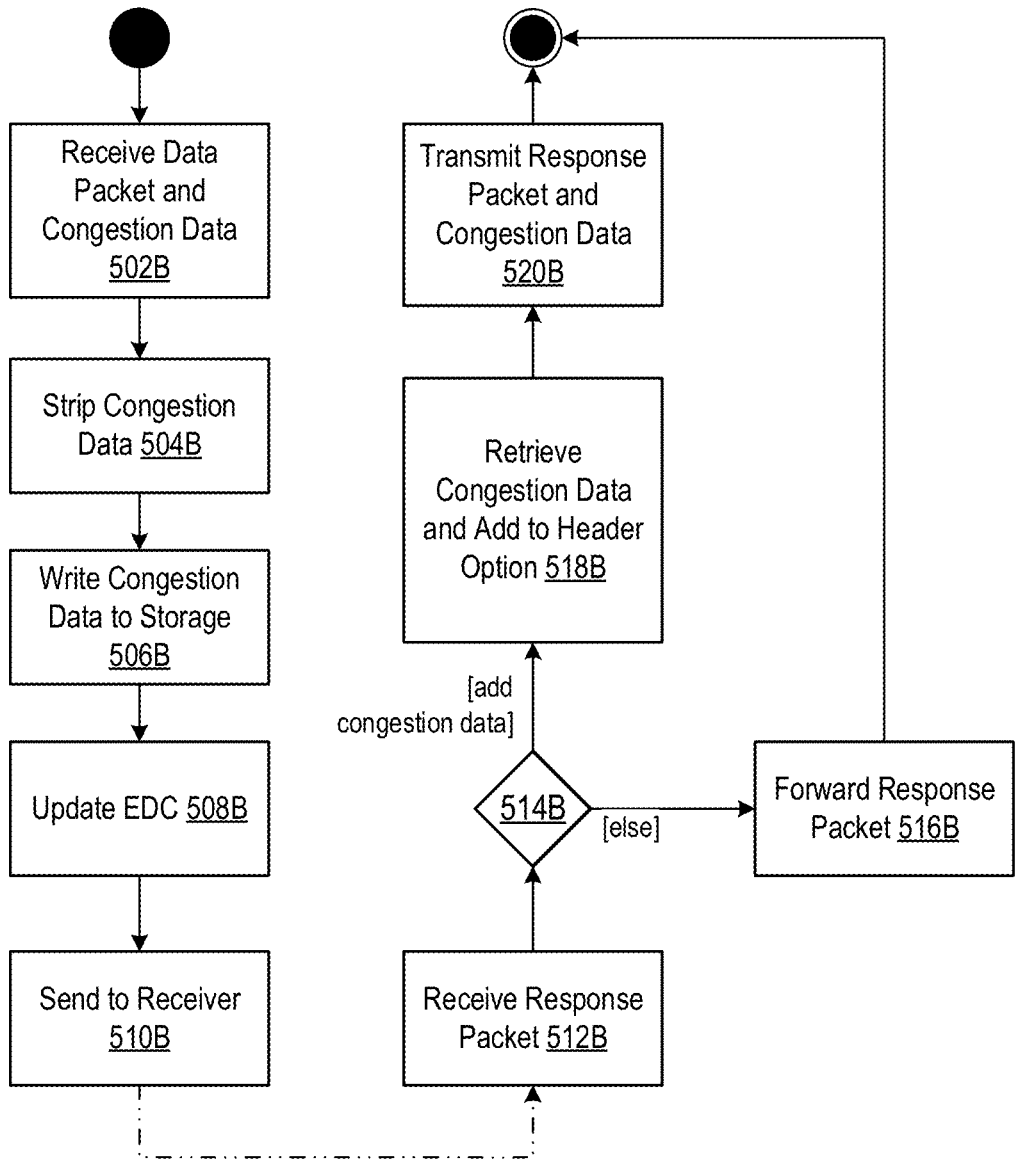
FIG. 5B is a flow diagram illustrating a method for reflecting congestion data associated with a response packet according to some embodiments of the disclosure.

FIG. 5B is a flow diagram illustrating a method for reflecting congestion data associated with a response packet according to some embodiments of the disclosure. In some embodiments, the method of FIG. 5B may be performed by a reflector (304). In some embodiments, the method of FIG. 5B may be performed by a cellular base station device (104). In other embodiments, the method of FIG. 5B may be performed by a UE (102).

In step 502B, the method may receive a data packet and congestion data. In one embodiment, the method receives the data packet from a congestion probe. In one embodiment, the congestion data is embedded in a header of the data packet as described in connection with FIG. 5A.

In step 504B, the method may strip the congestion data from the data packet. In one embodiment, the method inspects the header information of the data packet and identifies the congestion data. In one embodiment, the method analyzes the options field of a TCP header to identify whether a "kind" field of an option matches a preconfigured congestion option kind (e.g., "60"). If so, the method removes the option from the header and thus "reconstructs" the original packet received by, for example, the congestion probe prior to augmentation with congestion data. As will be discussed, the EDC must be re-computed to fully reconstruct the original packet.

In step 506B, the method may write the congestion data to a temporary storage location.

In one embodiment, the method writes the congestion data to a key-value store. In one embodiment, the key-value store comprises an in-memory key-value store, although persistent key-value stores may be used. In the illustrated embodiment, the method uses a flow identifier (ID) of the data packet as the key and the congestion data as the value; thus, enabling lookup by flow ID. In one embodiment, the flow ID comprises a value operable to uniquely identify a sequence of data transmission and acknowledgment. In an alternative embodiment, a TCP sequence number may be used as a key. In general, any value that can be used to match a TCP transmission to an acknowledgment may be used as the key.

In step 508B, the method may update the EDC of the data packet. In one embodiment, after stripping the congestion data, the data packet includes an invalid EDC since the EDC was generated using at least in part the congestion data. Thus, the method may recalculate the EDC after stripping the congestion data to reconstruct the original EDC value received from the sender. Thus, in effect, the method "reconstructs" the original packet after stripping the congestion data. In this manner, the packet sent by the sender and received by the receiver is effectively unchanged.

In step 510B, the method may transmit the data packet to a designated receiver. In one embodiment, the method transmits the data packet over a network to the receiver. Alternatively, the method may transmit the packet internally via an application programming interface to a downstream application (i.e., another application running on the same device as the device executing the method).

In the illustrated embodiment, the broken line between steps 510B and 512B represents a passage of time during which a receiver processes the data packet and ultimately returns a response packet.

In step 512B, the method may receive an acknowledgment of the data packet from the receiver via a response packet (e.g., a TCP ACK packet). In one embodiment, the method receives the response packet over a network. In other embodiments, the method receives the response packet via an API.

In step 514B, the method may determine whether to augment the response packet with the congestion data that was stripped in step 504B and written in step 506B.

In one embodiment, the method selectively adds congestion data to response packets and thus does not add congestion data to all response packets. The embodiments of FIG. 5D provide details on how the method determines whether to augment a response packet with congestion data in some embodiments. In brief, the method inspects the header of the data packet and determines one or more conditions are met based on the format of the header. If the method determines that the header meets the predefined conditions, the method determines that congestion data should be added. If not, the method does not add congestion data.

In step 516B, if the method determines that the congestion data should not be added to the response packet, the method may forward the acknowledgment response to the intended recipient. In this embodiment, the method may also remove the congestion data from the temporary storage. In one embodiment, the method may issue a delete command using the flow ID or sequence number included in the response packet to remove the associated congestion data from the temporary storage. The method may then forward the response packet to the enforcer via the congestion probe.

In step 518B, if the method determines that the congestion data should be added to the response packet, the method may retrieve the congestion data from the temporary storage location and may add the retrieved congestion data to a header option of the response packet. In one embodiment, the method may extract a flow ID or sequence number from the response packet header. The method may then query the temporary storage location using the flow ID or sequence number to retrieve the cached congestion data. If no matching key exists (not illustrated), the method may proceed to step 516B and forward the response packet. If a matching key exists, the method may retrieve the congestion data from the temporary location and, in some embodiments, delete the congestion data from the temporary storage location as discussed previously.

After retrieving the congestion data, the method may add the congestion data to an option field of the header of the response packet. Various details of this operation have been described in step 510A and are not repeated herein. However, in step 518B the method does not proactively retrieve congestion data from a network management algorithm or device. Instead, the method retrieves the underlying congestion data from the temporary storage location. The method then builds the congestion option (e.g., kind, length, data) as described in step 510A and inserts the congestion option into the options field of the response packet header. Finally, the method recalculates the EDC and updates the EDC as described in the description of step 512A.

In step 520B, the method may then transmit the response packet that includes the congestion data to the intended recipient. As discussed previously, the method may transmit the response packet to a congestion probe, which then forwards the response packet to an enforcer and, ultimately, back to the sender.

Figure 5C:
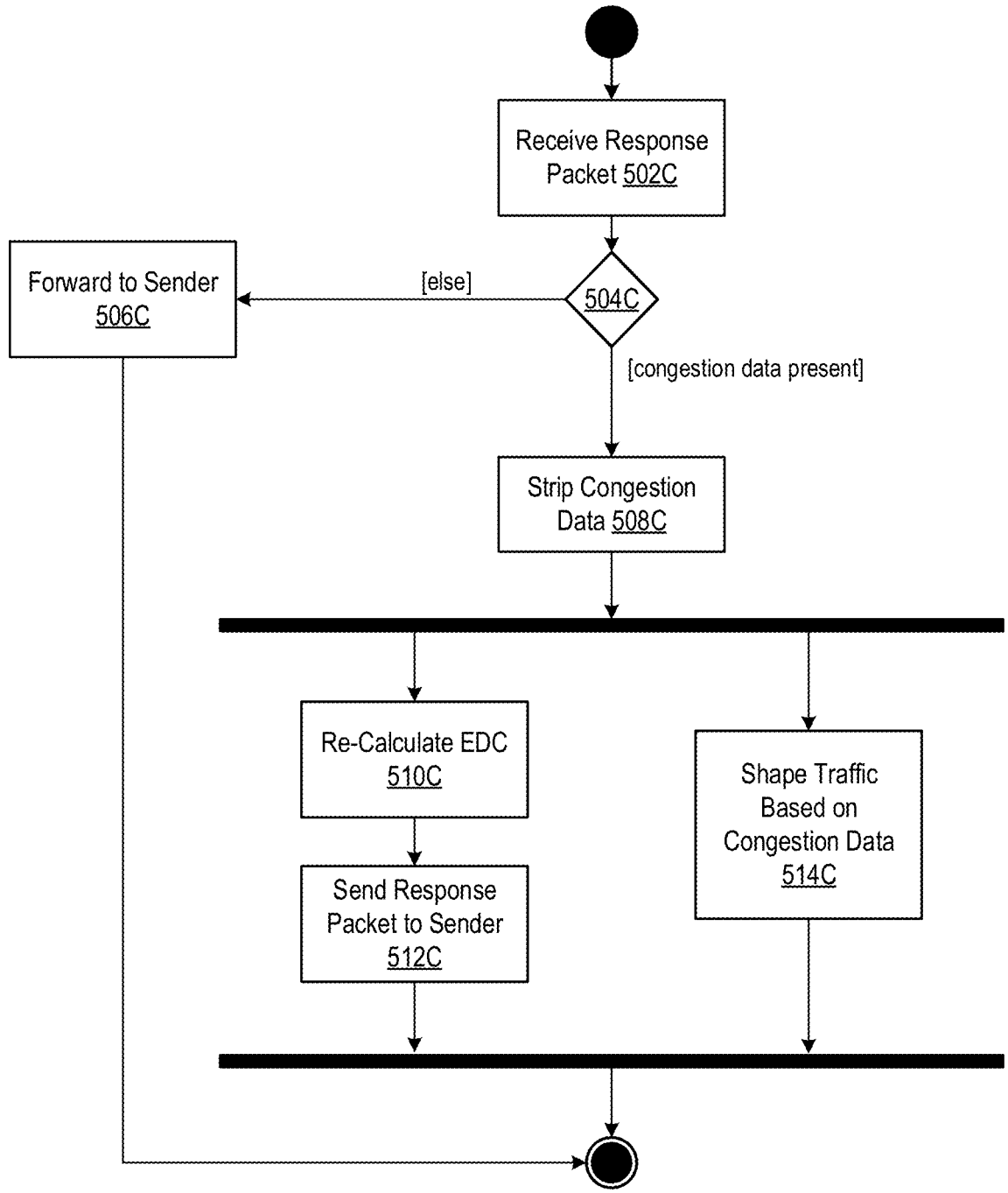
FIG. 5C is a flow diagram illustrating a method for processing congestion data included in a packet according to some embodiments of the disclosure.
Figure 5D:
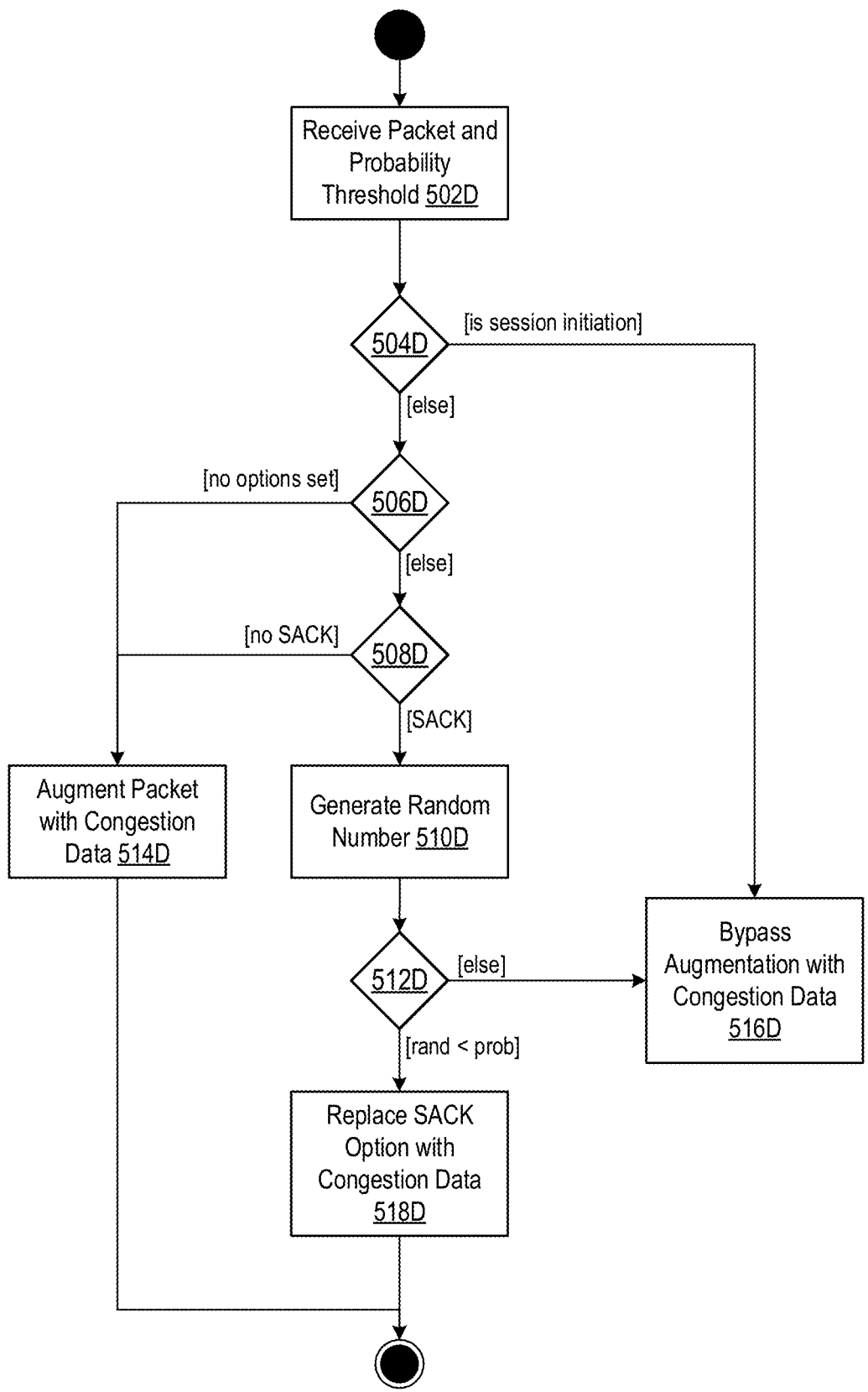
FIG. 5D is a flow diagram illustrating a method for determining whether to include congestion data in a package according to some embodiments of the disclosure.

FIG. 5C is a flow diagram illustrating a method for processing congestion data included in a packet according to some embodiments of the disclosure. In some embodiments, the method of FIG. 5C may be performed by an enforcer (308). In some embodiments, the method of FIG. 5C may be performed by a core network (106) of a cellular network. In some embodiments, the method of FIG. 5C may be performed by a PEP (210) of a core network (106). In other embodiments, the method of FIG. 5C may be performed by a server (110).

In step 502C, the method may receive a response packet. As discussed above, the response packet may comprise a TCP ACK packet. In one embodiment, the method receives the response packet from a congestion probe. In one embodiment, the congestion probe forwards the response packet, without change, after receiving it from the reflector.

In step 504C, the method may determine whether congestion data is present in the response packet. In the illustrated embodiment, the response packet includes an options field that includes congestion data generated by a congestion probe, cached by a reflector, and added to the ACK packet by the reflector. In step 504C, the method determines if this option field includes a congestion option within this options field.

In step 506C, if the method determines that congestion data is not present in the response packet, the method may forward the response packet to the sender of the data causing the receiver to transmit the response packet. In this scenario, the response packet comprises a standard response packet (e.g., TCP ACK), and the method bypasses further processing and returns the response packet to the sender.

In step 508C, if the method determines that congestion data is present in the response packet, the method may strip the congestion data from the response packet. In this scenario, the method inspects the header of the response packet and removes the congestion option from the header. The method may then extract the congestion data from the option.

In step 510C, the method may recalculate the EDC of the data packet. In one embodiment, after stripping the congestion data, the response packet includes an invalid EDC since the EDC was generated using at least in part the congestion data. Thus, the method may recalculate the EDC after stripping the congestion data to reconstruct the original EDC value received from the reflector (and thus receiver). Thus, in effect, the method "reconstructs" the original response packet after stripping the congestion data. In this manner, the response packet sent by the receiver and received by the receiver are, effectively, unchanged.

In step 512C, the method may send the response packet (with updated EDC) to the sender. In this manner, the sender receives a standard response packet in response to the original transmitted packet transmitted in step 502A.

In step 514, the method may shape network traffic based on the congestion data. As illustrated, steps 510C and 512C may be executed in parallel with step 514C.

In one embodiment, the method analyzes the congestion data to determine whether to shape traffic in the network. In one embodiment, a separate control path may be used to coordinate traffic shaping across network elements. In another embodiment, the traffic shaping may be performed entirely in an enforcer device that is installed within an edge element such as a PEP. In general, traffic shaping may be triggered based on the congestion data. For example, if a drop probability exceeds a threshold, traffic shaping may be triggered. Alternatively, or in conjunction with the foregoing, if the available buffer size is below a minimum threshold, traffic shaping may be triggered. The disclosed embodiments place no limitation on the types of traffic shaping that may be employed, and indeed, any type of traffic shaping may be employed. For example, any techniques described in IETF RFC 3135 may be utilized to shape traffic (e.g., tunneling, compression, ACK spacing, priority-based multiplexing, etc.).

FIG. 5D is a flow diagram illustrating a method for determining whether to include congestion data in a package according to some embodiments of the disclosure. In some embodiments, the method of FIG. 5D may be performed by a congestion probe (306). In some embodiments, the method of FIG. 5D may be performed by a cellular base station device (104). Alternatively, or in conjunction with the foregoing, the method of FIG. 5D may also be performed by a reflector (304). In such embodiments, the method of FIG. 5D may also be performed by a UE (102) or cellular base station device (104).

In step 502D, the method may receive a data packet and a fixed probability threshold value. In one embodiment, the data packet comprises a data packet transmitted by a sender and received by a congestion probe in step 502A. Alternatively or in conjunction with the foregoing, the data packet may comprise a response packet (e.g., TCP ACK packet) received by a reflector in step 512B. In one embodiment, the fixed probability threshold may comprise a fixed probability value (between 0 and 1) that represents a rate in which certain types of packets are augmented with congestion data. The fixed probability value may be tuned based on observations of the systems. This tuning may be manual or may be programmatic based on analyzing the number of packets that include congestion data and a target percentage. In one embodiment, the fixed probability threshold value may be set to 0.5 to effectively replace half of all packets that include a SACK option with congestion options (described herein).

In step 504D, the method may determine if the data packet is a session initiation packet. In one embodiment, a session initiation packet comprises a TCP SYN packet or a TCP SYN-ACK packet. In this embodiment, the method analyzes the control bits (614) of the packet header to determine if the SYN bit is set to one. If so, the method confirms that the packet is a SYN packet used in the initiation (e.g., three-way handshake) of a TCP session.

In step 516D, the method may bypass augmenting the data packet with congestion data if the packet is a session initiation packet. In general, since SYN packets are used to start a session, the method will not collect congestion data during this initiation so as to avoid blocking sessions.

In step 506D, if the method determines that the data packet is not a session initiation packet, the method may then determine if no header options are set in the data packet. In this step, the method may inspect the options field (622) to determine if any options are present in the header. If the option field (622) is missing (i.e., empty), the method confirms that no header options are included in the packet.

In step 514D, the method may augment the data packet with congestion data upon determining that no header options are set in step 506D. Details of adding congestion data have been described in the descriptions of steps 510A and 518B and are not repeated herein. In the illustrated embodiment, the method may perform the process described with respect to step 510A when processing a packet received from a sender and perform the process described with respect to step 518B when processing a response packet received from a receiver.

In step 508D, if the method determines that the packet is not a session initiation packet and at least one header option is set, the method may then determine if a SACK option is included in at least one header option. As discussed previously, a SACK option indicates a selective acknowledgment of data in the TCP transmission.

In step 514D, the method may augment the data packet with congestion data upon determining that no SACK option is set in step 508D. Details of adding congestion data have been described in the descriptions of steps 510A and 518B and are not repeated herein. In the illustrated embodiment, the method may perform the process described with respect to step 510A when processing a packet received from a sender and perform the process described with respect to step 518B when processing a response packet received from a receiver.

In step 510D, if the method determines that a SACK option is set, the method may then generate a random number. In general, steps 510D and 512D are designed to selectively augment a packet with congestion data while retaining a portion of those packets that include a SACK option. In one embodiment, the random number may comprise a truly random or pseudo-random value.

In step 512D, the method determines if the random number generated in step 510D is greater than the fixed probability threshold value.

In step 516D, the method may bypass augmenting the data packet with congestion data if the random number is less than the fixed probability threshold value. Conversely, in step 518D, the method may replace the SACK option set in the data packet with congestion data if the random number is greater than the fixed probability threshold value. In contrast to step 514D, the method in step 518D removes the SACK option and "replaces" it with a congestion option that includes congestion data.

Generally, replacing a fraction of the TCP SACK options with congestion options would not cause serious performance issues, such as TCP Retransmission Time Outs (RTOs), since the SACK option usually appears in multiple TCP ACK packets (referred to as duplicated ACKs). In step 518D, the method may remove the SACK option from the packet header and replace the SACK option with the congestion data. By only performing this replacement on a subset of packets with SACK options, the method can reduce performance penalties that would occur if all SACK options were stripped.

Figure 6:
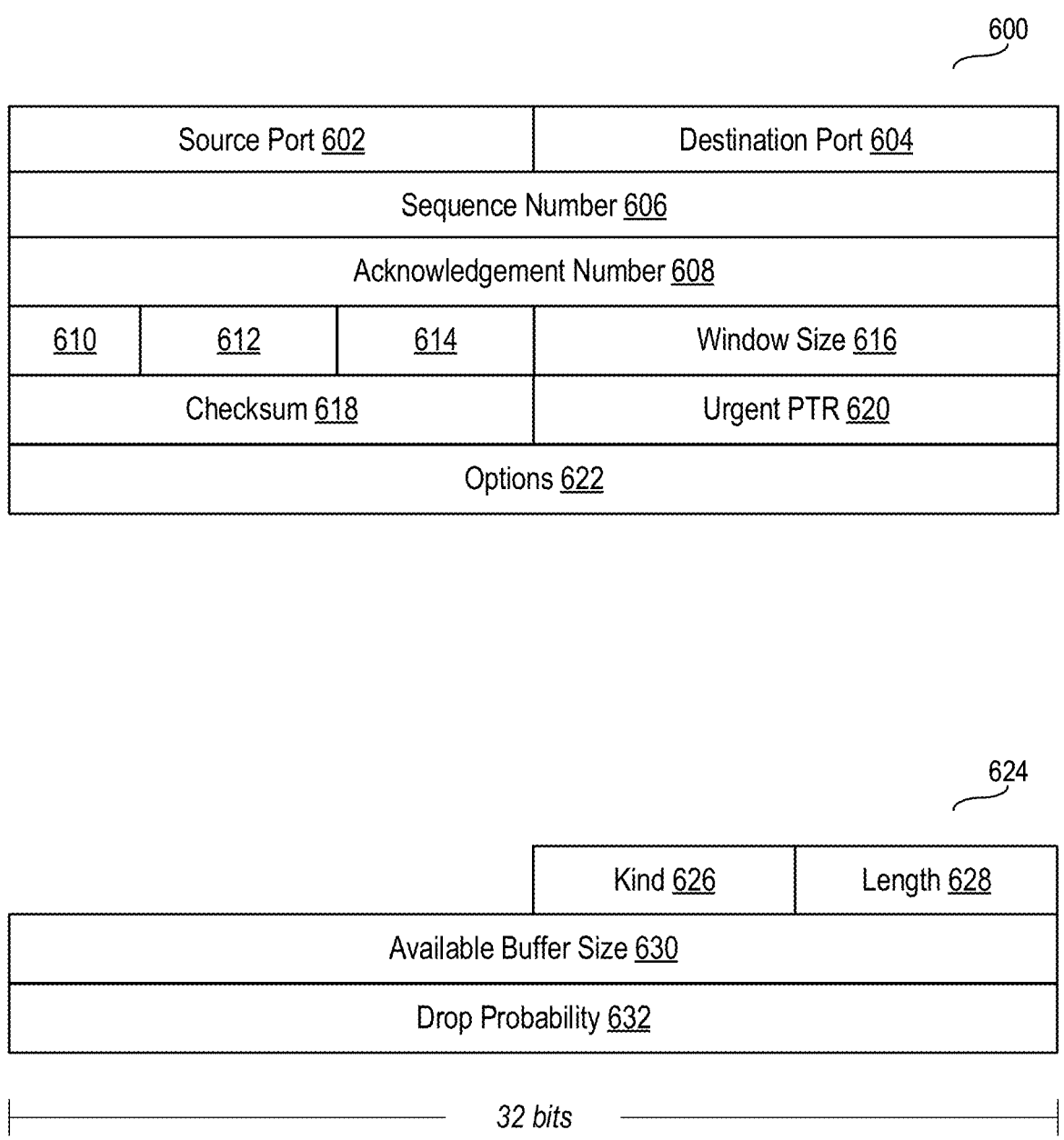
FIG. 6 is a diagram of a packet format for congestion data according to some embodiments of the disclosure.

FIG. 6 is a diagram of a packet format for congestion data according to some embodiments of the disclosure.

In the illustrated embodiment, a packet format is illustrated that comprises a TCP header and data chunk. Other protocols may be used, and TCP is used as an example only.

In the illustrated embodiment, a TCP header (600) includes various fields, including a source port field (602), a destination port field (604), a sequence number field (606), an acknowledgment number field (608), a header length field (610), a reserved field (612), a plurality of control bits (614), a window size field (616), a checksum field (618), and urgent pointer field (620), and an options field (622). In one embodiment, these fields conform to IETF RFC 793 (and subsequent standards), and only a brief overview is provided herein.

In one embodiment, the source port field (602) and destination port field (604) comprise a 16-bit value representing the port number of the sender and recipient, respectively. The sequence number field (606) comprises the sequence number of the first data octet in a TCP segment (except when a SYN bit is set in control bits 614). In one embodiment, if the SYN bit is present, the sequence number is the initial sequence number (ISN), and the first data octet is ISN+1. In some embodiments, the acknowledgment number field (608) is set when an ACK control bit in the control bits (614) is set. In one embodiment, the acknowledgment number field (608) contains the value of the next sequence number the sender of the segment is expecting to receive. In some embodiments, once a connection is established, this is always sent. In one embodiment, the header length field (610) is an integer value representing the number of 32-bit words in the TCP Header. In the illustrated embodiment, the TCP header (600) includes a reserved field (612), which is unused and ignored. In some embodiments, the reserved field (612) is set to all zeros.

The TCP header (600) includes control bits (614). In one embodiment, these six bits are named URG, ACK, PSH, RST, SYN, and FIN. In one embodiment, these bits may be either on (logical one) or off (logical zero). In the illustrated embodiment, the URG bit may be used to treat certain data on an urgent basis. In some embodiments, when the URG bit is set to one, it may indicate to the receiver that a certain amount of data within the current segment is urgent. In some embodiments, urgent data may be pointed out by evaluating the urgent pointer field (620). In some embodiments, the receiver may prioritize the urgent data and may forward urgent data to the receiving application on a separate channel. In the illustrated embodiment, the ACK bit may indicate whether the acknowledgment number field is valid or not. In some embodiments, when the ACK bit is set to one, it may indicate that the acknowledgment number contained in the TCP header (600) is valid. In some embodiments, for all TCP segments except a request segment, the ACK bit may be set to one. In some embodiments, a request segment may be sent for connection establishment during a three-way handshake to initialize a connection. In the illustrated embodiment, the PSH bit may be used to push the entire buffer immediately to the receiving application. In the illustrated embodiment, the RST bit may be used to reset the TCP connection. In the illustrated embodiment, the SYN bit may be used to synchronize the sequence numbers. In some embodiments, when the SYN bit is set to one, it may indicate to the receiver that the sequence number field (606) contained in the TCP header (600) is the initial sequence number. In some embodiments, a request segment sent for connection establishment during a three-way handshake contains a SYN bit set to 1. In some embodiments, the FIN bit may be used to terminate the TCP connection.

The TCP header (600) additionally may include a window size field (616). In some embodiments, this field may include a number of data octets beginning with the one indicated in the acknowledgment field, which the sender of this segment is willing to accept. The TCP header (60) may include a checksum field (618) that comprises a fixed-length (e.g., 16-bit) field used for error control. In one embodiment, the checksum field (618) may be computed by a sender (or intermediary device, as explained herein) using a cyclical redundancy check (CRC) algorithm. In one embodiment, the input to the CRC algorithm may comprise the one's complement sum of all 16-bit words in the header and text, although other permutations of data in the TCP header (600) may be used.

As discussed above, the TCP header (600) includes an urgent pointer field (620) that communicates the current value of the urgent pointer as a positive offset from the sequence number in this segment.

The TCP header (600) may additionally include one or more options in an options field (622). In the illustrated embodiment, the options field (622) comprises the final field of the header and may be of variable length. In one embodiment, the size of the options field (622) comprises the total size of all options in the field, which may comprise one or more options. In one embodiment, an option may comprise a single octet field. Alternatively, or in conjunction with the foregoing, an option may comprise a first octet representing an option kind, a second octet representing an option length, and a variable-sized data field. An example of the latter type of option is illustrated as congestion option (624).

Under RFC 2780, a TCP header can use up to 255 different TCP options. In general, however, most cellular networks utilize five types of options: maximum segment size (MSS), window scaling, timestamping, no option (NOOP), and selective acknowledgments (SACKs). Generally, MSS, window scaling, timestamping, and NOP options are either only are used during three-way handshakes (with SYN flag set) or only use less than 4 bytes. Thus, among the five kind TCP options which are usually transmitted on cellular networks, SACK is the primary one that could be used in TCP data packets (with an ACK flag set) or ACK packets. In general, SACK is a strategy in which the data receiver can inform the sender about all segments that have arrived successfully, so the sender need only retransmit the segments that have actually been lost. SACK options are thus only used in the TCP ACK stream.

In the illustrated embodiment, congestion (e.g., AQM) information is passed through the network as a new option in the options field (622). The format of the congestion information option is illustrated in congestion option (624). By utilizing a TCP option to pass congestion data, no modification is needed by TCP endpoints (i.e., senders or receivers). In contrast, existing congestion management schemes (e.g., XCP) require modifications to the TCP/IP stack, specifically adding a new congestion layer between IP and TCP. The disclosed embodiments do not impose such a requirement. Further, unlike other schemes (e.g., ECN), the use of a congestion option (624) enables the disclosed embodiments to pass quantitative congestion data from congestion devices (e.g., base station devices) to an active sending endpoint.

In the illustrated embodiment, the congestion option (624) includes a kind field (626), length field (628), available buffer size field (630), and drop probability field (632). In the illustrated embodiment, the kind field (626) and length field (628) are octets, while the available buffer size field (630) and drop probability field (632) are 32-bit fields. Other lengths may be used.

In the illustrated embodiment, the kind field (626) comprises a preconfigured value representing the option. As one example, the kind field (626) may comprise the value of 60 to indicate the type of option as a congestion option. Other fixed values may be used according to RFC 2780.

The length field (628) may be used to describe the length (in terms of octets) of the congestion option (624). In the illustrated embodiment, the actual option field length value may comprise eight octets (i.e., 64 bits).

The available buffer size field (630) may be used to describe the current available buffer space in terms of bytes inside the bottleneck devices, such as cellular base stations. As discussed in connection with FIGS. 3A through 3C, A congestion probe may be configured to read the available buffer size from a network buffer and populate the value stored in the available buffer size field (630) based on the reading.

The drop probability field (632) may be used to describe the dropping probability (e.g., in float32 format) used by an AQM scheme implemented in a bottleneck device such as a cellular base station. In one embodiment, such a bottleneck device may implement a RED method to start dropping packets even before the device runs out of buffer space. Thus, the output of this RED method may be used to populate the drop probability field (632) value.

In other embodiments, other fields (or additional) fields may be used to represent congestion data in the congestion option (624), and the disclosure is not limited to only the fields depicted in FIG. 6. For example, in some embodiments, the congestion option (624) may use relative available queue buffer size (in fractional format, e.g., about 50% of buffer available) to describe the available buffer space. Alternatively, or in conjunction with the foregoing, the congestion option (624) may also increase the congestion option length up to 40 bytes to carry even more detailed congestion data. In general, since the congestion option (624) uses a single octet length field (628), any data up to 256 bits may be used in the congestion option (624).

Figure 7:
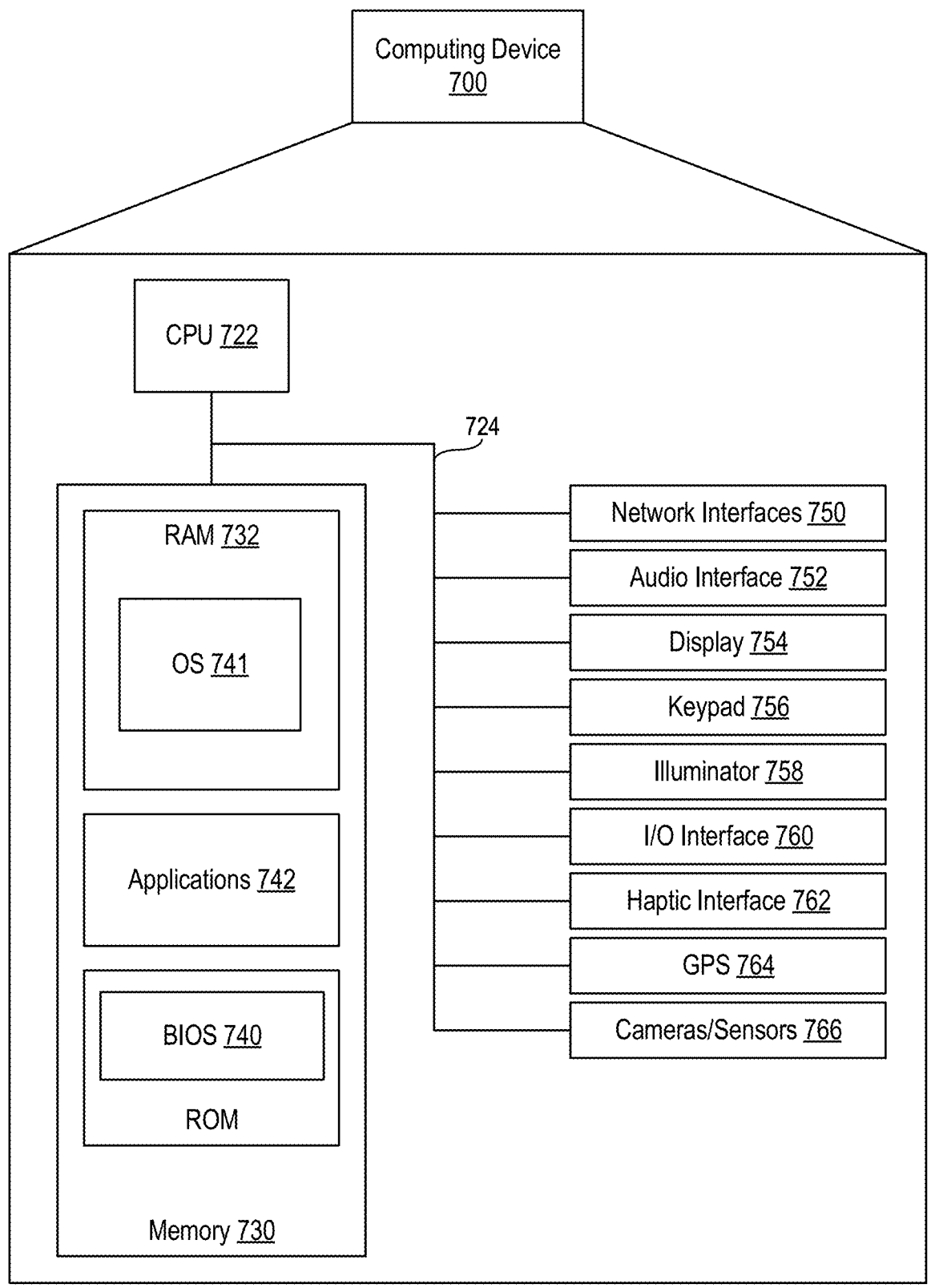
FIG. 7 is a block diagram illustrating a computing device showing an example of a client or server device used in the various embodiments of the disclosure

FIG. 7 is a block diagram illustrating a computing device showing an example of a client or server device used in the various embodiments of the disclosure.

The computing device (700) may include more or fewer components than those shown in FIG. 7, depending on the deployment or usage of the device (700). For example, a server computing device, such as a rack-mounted server, may not include audio interfaces (752), displays (754), keypads (756), illuminators (758), haptic interfaces (762), Global Positioning Service (GPS) receivers (764), or cameras/sensors (766). Some devices may include additional components not shown, such as graphics processing unit (GPU) devices, cryptographic co-processors, artificial intelligence (AI) accelerators, or other peripheral devices.

As shown in the figure, the device (700) includes a central processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766) or a plurality of cameras/sensors (766). The positioning of the camera(s)/sensor(s) (766) on the device (700) can change per device (700) model, per device (700) capabilities, and the like, or some combination thereof.

In some embodiments, the CPU (722) may comprise a general-purpose CPU. The CPU (722) may comprise a single-core or multiple-core CPU. The CPU (722) may comprise a system-on-a-chip (SoC) or a similar embedded system. In some embodiments, a GPU may be used in place of, or in combination with, a CPU (722). Mass memory (730) may comprise a dynamic random-access memory (DRAM) device, a static random-access memory device (SRAM), or a Flash (e.g., NAND Flash) memory device. In some embodiments, mass memory (730) may comprise a combination of such memory types. In one embodiment, the bus (724) may comprise a Peripheral Component Interconnect Express (PCIe) bus. In some embodiments, the bus (724) may comprise multiple busses instead of a single bus.

Mass memory (730) illustrates another example of computer storage media for the storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from a hard disk drive (not illustrated) and temporarily stored in RAM (732) by CPU (722). CPU (722) may then read the software or data from RAM (732), process them, and store them to RAM (732) again.

The computing device (700) may optionally communicate with a base station (not shown) or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises an input/output interface (760) for communicating with external devices, using communication technologies, such as USB, infrared, Bluetooth™, or the like. The haptic interface (762) provides tactile feedback to a user of the client device.

The optional GPS receiver (764) can determine the physical coordinates of the computing device (700) on the surface of the Earth, which typically outputs a location as latitude and longitude values. GPS receiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may communicate through other components, provide other information that may be employed to determine a physical location of the device, including, for example, a MAC dress, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   receiving, by a computing device, a packet from a sender over a network;
   retrieving, by the computing device, congestion information;
   inserting, by the computing device, congestion data representing the congestion information into a header option of the packet to generate an augmented packet;
   transmitting, by the computing device, the augmented packet to a receiver;
   receiving, by the computing device, a response packet, the response packet including the congestion data;
   transmitting, by the computing device, the response packet to a second computing device;
   stripping, by the second computing device, the congestion data from the response packet to reconstruct an original response packet;
   shaping, by the second computing device, network traffic based on the congestion data; and
   transmitting, by the second computing device, the original response packet to the sender.

2. The method of claim 1, wherein inserting the congestion data further comprises automatically inserting the congestion data into the header option when no other header options in the packet are set.

3. The method of claim 2, wherein inserting the congestion data further comprises inserting the congestion data into the header option when a selective acknowledgment (SACK) option is not set and at least one other header option is set.

4. The method of claim 1, wherein inserting the congestion data further comprises:
   receiving a probability threshold value;
   generating a random number; and
   replacing a selective acknowledgment (SACK) option with the congestion data when the random number is greater than the probability threshold value.

5. The method of claim 1, further comprising recalculating an error detection code field after inserting the congestion data and replacing a previous error detection code field present in the packet.

6. The method of claim 5, wherein recalculating an error detection code field comprises computing a cyclical redundancy check (CRC) using at least in part the congestion data.

7. The method of claim 1, further comprising:
   stripping, by a third computing device, the congestion data from the augmented packet to reconstruct an original packet;
   caching, by the third computing device, the congestion information;
   transmitting, by the third computing device, the original packet to the receiver;
   receiving, by the third computing device, the response packet;
   retrieving, by the third computing device, the congestion data associated with the response packet and the original packet; and
   augmenting, by the third computing device, the response packet with the congestion data.

8. A non-transitory computer-readable storage medium for storing instructions capable of being executed by a processor, the instructions defining steps of:
   receiving, at a first computing device, a packet from a sender over a network;
   retrieving, at a first computing device, congestion information;
   inserting, at a first computing device, congestion data representing the congestion information into a header option of the packet to generate an augmented packet;
   transmitting, at a first computing device, the augmented packet to a receiver;
   receiving, at a first computing device, a response packet, the response packet including the congestion data;
   transmitting, at a first computing device, the response packet to a second computing device;
   stripping, by the second computing device, the congestion data from the response packet to reconstruct an original response packet;
   shaping, by the second computing device, network traffic based on the congestion data; and
   transmitting, by the second computing device, the original response packet to the sender.

9. The non-transitory computer-readable storage medium of claim 8, wherein inserting the congestion data further comprises automatically inserting the congestion data into the header option when no other header options in the packet are set.

10. The non-transitory computer-readable storage medium of claim 9, wherein inserting the congestion data further comprises automatically inserting the congestion data into the header option when a selective acknowledgment (SACK) option is not set and at least one other header option is set.

11. The non-transitory computer-readable storage medium of claim 8, wherein inserting the congestion data further comprises:
   receiving a probability threshold value;
   generating a random number; and
   replacing a SACK option with the congestion data when the random number is greater than the probability threshold value.

12. The non-transitory computer-readable storage medium of claim 8, the instructions further defining a step of recalculating an error detection code field after inserting the congestion data and replacing a previous error detection code field present in the packet.

13. The non-transitory computer-readable storage medium of claim 12, wherein recalculating an error detection code field comprises computing a cyclical redundancy check (CRC) using at least in part the congestion data.

14. The non-transitory computer-readable storage medium of claim 8, the instructions further defining the steps of:
   stripping, by a third computing device, the congestion data from the augmented packet to reconstruct an original packet;
   caching, by the third computing device, the congestion information;
   transmitting, by the third computing device, the original packet to the receiver;
   receiving, by the third computing device, the response packet;
   retrieving, by the third computing device, the congestion data associated with the response packet and the original packet; and
   augmenting, by the third computing device, the response packet with the congestion data.

15. A system comprising:
   a first computing device; and
   a second computing device,
   wherein the first computing device is configured to:
      receive a packet from a sender over a network,
      retrieve congestion information,
      insert congestion data representing the congestion information into a header option of the packet to generate an augmented packet,
      transmit the augmented packet to a receiver,
      receive a response packet, the response packet including the congestion data, and
      transmit the response packet to the second computing device,
   wherein the second computing device is configured to:
      strip the congestion data from the response packet to reconstruct an original response packet;
      shape network traffic based on the congestion data; and
      transmit the original response packet to the sender.

16. The system of claim 15, wherein inserting the congestion data further comprises automatically inserting the congestion data into the header option when no other header options in the packet are set.

17. The system of claim 16, wherein inserting the congestion data further comprises automatically inserting the congestion data into the header option when a selective acknowledgment (SACK) option is not set and at least one other header option is set.

18. The system of claim 15, wherein inserting the congestion data further comprises:
   receiving a probability threshold value;
   generating a random number; and
   replacing a selective acknowledgment (SACK) option with the congestion data when the random number is greater than the probability threshold value.

19. The system of claim 15, wherein the first computing device is further configured to recalculate an error detection code field after inserting the congestion data and replacing a previous error detection code field present in the packet.

20. The system of claim 19, wherein recalculating an error detection code field comprises computing a cyclical redundancy check (CRC) using at least in part the congestion data.

* * * * *